United States Patent [19]
Kato

[11] Patent Number: 5,384,525
[45] Date of Patent: Jan. 24, 1995

[54] METHOD OF CONTROLLING A SERVOMOTOR

[75] Inventor: Tetsuaki Kato, Oshino, Japan

[73] Assignee: Fanuc Ltd., Yamanashi, Japan

[21] Appl. No.: 961,902

[22] PCT Filed: May 14, 1992

[86] PCT No.: PCT/JP92/00622
§ 371 Date: Jan. 8, 1993
§ 102(e) Date: Jan. 8, 1993

[87] PCT Pub. No.: WO92/21078
PCT Pub. Date: Nov. 26, 1992

[30] Foreign Application Priority Data
May 17, 1991 [JP] Japan .................. 3-140656

[51] Int. Cl.[6] ............................ G05D 3/12
[52] U.S. Cl. .................... 318/610; 318/609; 318/568.1; 364/160; 364/165
[58] Field of Search ............... 318/560–646; 364/160–168

[56] References Cited

U.S. PATENT DOCUMENTS

| | | | |
|---|---|---|---|
| 4,675,804 | 6/1987 | Wiemer | 318/609 X |
| 4,713,596 | 12/1987 | Bose | 318/802 |
| 4,914,365 | 4/1990 | Murakami et al. | 318/609 |
| 4,967,128 | 10/1990 | Sawai et al. | 318/609 |
| 5,056,038 | 10/1991 | Kuno et al. | 364/165 |
| 5,093,609 | 3/1992 | Sakamoto et al. | 318/610 |
| 5,111,124 | 5/1992 | Kurosawa | 318/434 |
| 5,157,597 | 10/1992 | Iwashita | 318/561 X |
| 5,216,342 | 6/1993 | Torii et al. | 318/568.1 |
| 5,223,778 | 6/1993 | Svarovsky et al. | 318/610 |
| 5,272,423 | 12/1993 | Kim | 318/560 |
| 5,276,387 | 1/1994 | Gamble | 318/135 |
| 5,285,379 | 2/1994 | Gamble | 364/160 |

FOREIGN PATENT DOCUMENTS

| | | |
|---|---|---|
| 60-189019 | 9/1985 | Japan . |
| 63-148302 | 6/1988 | Japan . |
| 63-301302 | 12/1988 | Japan . |
| 1-100611 | 4/1989 | Japan . |
| 2-297611 | 12/1990 | Japan . |

*Primary Examiner*—Paul Ip
*Attorney, Agent, or Firm*—Staas & Halsey

[57] ABSTRACT

A servomotor control method utilizing conventional linear control techniques, which permits easy introduction of sliding mode control. The phase surface of the sliding mode is made to be equivalent to a mode of obtaining a torque command by a conventional linear control, and a switching input ($\tau1$) is added to the torque command ($\tau0$) obtained by the linear control, thereby further obtaining a corrected torque command ($\tau$). The switching input ($\tau1$) is determined in accordance with the positive or negative sign of the torque command ($\tau0$) and the signs of various values such as a position deviation ($\epsilon$), a speed loop integral, etc., which are obtained during the calculation of the torque command ($\tau0$).

3 Claims, 4 Drawing Sheets

1

METHOD OF CONTROLLING A SERVOMOTOR

BACKGROUND OF THE INVENTION

1. Field of Invention

This invention relates to a method of controlling a servomotor for driving various machines such as a robot and a machine tool, and more particularly, to a sliding mode control.

2. Description of the Related Art

A variety of sliding mode control techniques are used for controlling servomotors in various machines to improve disturbance suppressing ability and achieve good follow-up with respect to commands. Such sliding mode control techniques are disclosed, for example, in Unexamined Japanese Patent Publications No. 2-297611 and No. 3-118618.

These conventional sliding mode control techniques, however, have no relevance to P control (proportional control) for a position loop or to PI control (proportional-plus-integral control) for a speed loop, which have conventionally been employed for controlling servomotors. Thus, conventional linear control techniques elaborated for the P and PI controls cannot be utilized at all for the control of a servomotor.

Thus, the application of the sliding mode control has been hindered mainly due to that the selection of various parameters is so time consuming and some other reasons.

SUMMARY OF THE INVENTION

The object of this invention is to permit easy introduction of sliding mode control, and to utilize conventional linear control techniques.

According to this invention, the phase surface of the sliding mode is set to be in proportion to a mode of obtaining a torque command when carrying out a proportional control for a position loop and a proportional-plus-integral control for a speed loop, and a switching input is added to the torque command obtained by a linear control process including the position loop process according to the proportional control and the speed loop process according to the proportional-plus-integral control, to obtain a corrected torque command. The servomotor is controlled in accordance with the corrected torque command.

The phase surface of the sliding mode is made to be equivalent to the mode of obtaining a torque command by a linear control in which the position loop is subjected to proportional control and the speed loop is subjected to proportional-plus-integral control. Thus, by adding the switching input to the torque command obtained by the linear control process, a torque command for the current loop is obtained, and the sliding mode control can be easily applied.

DETAILED DESCRIPTION OF THE PREFERRED EMBODIMENTS

Figure 1:
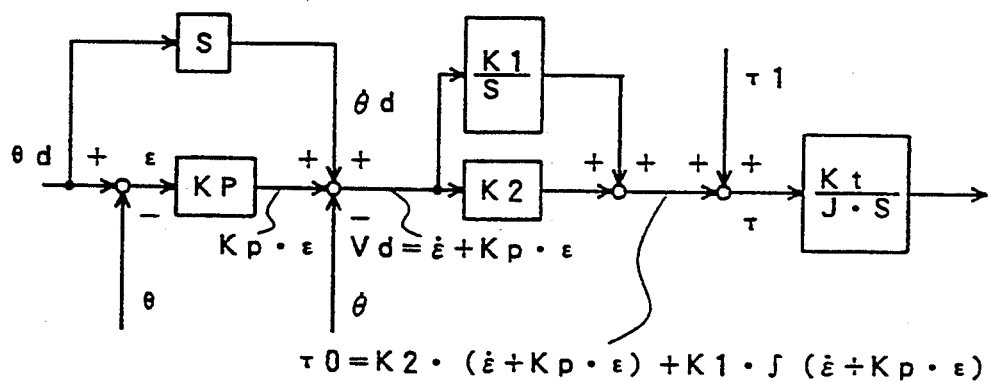
FIG. 1 is a block diagram illustrating a servomotor control method according to one embodiment of this invention.

First, a phase surface (switching surface) Suf is defined as expressed by the following equation (1):

$$Suf = \epsilon + Kp \cdot \epsilon + (K1/K2) \cdot \int (\epsilon + Kp \cdot \epsilon) \qquad (1)$$

In equation (1), Kp is a position gain of a position loop according to P control, and K1 and K2 are an integral gain and a proportional gain, respectively, of a speed loop according to PI control. $\epsilon$ represents a position deviation, while $\epsilon$ represents the derivative of the position deviation, i.e., a speed deviation. In the following, symbols with one dot give above denote first-time derivatives, and symbols with two dots given above denote second-time derivatives.

For the Liapunov function V, the following formula (2) is defined:

$$V = (\tfrac{1}{2}) \cdot Suf^2 \qquad (2)$$

The derivative of the Liapunov function V is given by the following equation (3):

$$\dot{V} = Suf \cdot \dot{Suf} \qquad (3)$$

If a servomotor is supplied with such an input that the resulting value of equation (30 is always negative, then the Liapunov function V is always positive, and the derivative thereof is negative, showing a monotonic decrease, so that the Liapunov function V and the phase surface Suf coverage to the minimum value "0." Accordingly, the responsiveness converges to Suf=0 and varies functionally, without being influenced by inertia or disturbance.

Here, the input toe the servomotor is defined as expressed by the following equation (4):

$$\begin{aligned}\tau &= K2 \cdot \{\epsilon + Kp \cdot \epsilon + (K1/K2) \cdot \int (\epsilon + Kp \cdot \epsilon)\} + \tau 1 \\ &= K2 \cdot \{\epsilon + Kp \cdot \epsilon\} + K1 \cdot \int (\epsilon + Kp \cdot \epsilon) + \tau 1\end{aligned} \qquad (4)$$

In equation (4), $\tau 1$ is a switching input.

Given that a move command and a position feedback quantity are $\eta d$ and $\eta$, respectively, the following equations (5) hold:

$$\begin{aligned}\epsilon &= \eta d - \eta \\ \dot{\epsilon} &= \dot{\eta} d - \dot{\eta} \\ \ddot{\epsilon} &= \ddot{\eta} d - \ddot{\eta}\end{aligned} \qquad (5)$$

FIG. 1 shows a block diagram for obtaining the servomotor input $\tau$ in equation (4) on the basis of equations (5). As seen from FIG. 1, the servomotor input $\tau$ is equal to the sum of the switching input $\tau 1$ and an output (torque command $\tau 0$) of a conventional linear control in which the position and speed loops are subjected to P control and PI control, respectively. In FIG. 1, Kt/(J·S) is the transfer function of the servomotor; Kt is the torque constant of the servomotor; J is the inertia; and S is the Laplace operator.

It is assumed that the controlled system is given by equation (6) below.

$$J\cdot\eta + A\cdot\eta + Gr + \tau d = \tau \quad (8)$$

In equation (6), A is the coefficient of kinetic friction; Gr is a gravity term, and $\tau d$ is an expected disturbance.

Differentiating both sides of equation (1) provides equation (7).

$$Suf = \epsilon + \{Kp + (K1/K2)\}\cdot\epsilon + (K1/K2)\cdot Kp\cdot\epsilon \quad (7)$$

Substituting equations (5) for equation (6), followed by rearrangement, provides the following equation (8):

$$\epsilon = \eta d + (A/J)\cdot\eta + (Gr/J) + (\tau d/J) - (\tau/J) \quad (8)$$

Then, when equation (4) is substituted for equation (8), equation (9) below is obtained:

$$\epsilon = \theta d + (A/J)\cdot\theta + (Gr/J) + (\tau d/J) - (K2/J)\cdot(\epsilon + Kp\cdot\epsilon) - (K1/J)\cdot\int(\epsilon + Kp\cdot\epsilon) - (\tau 1/J) \quad (9)$$

Substituting equation (9) for equation (7), followed by rearrangement, provides equation (10).

$$Suf = \{Kp + (K1/K2) - (K2/J)\}\cdot\epsilon + \{(K1/K2)\cdot Kp - (K2/J)\cdot Kp\}\cdot\epsilon + \theta d + (A/J)\cdot\theta + (Gr/J) + (\tau d/J) - (K1/J)\cdot\int(\epsilon + Kp\cdot\epsilon) - (\tau 1/J) \quad (10)$$

Then, when equation (1) is solved for the derivative term of the position deviation, the following equation (11) is obtained:

$$\epsilon = Suf - Kp\cdot\epsilon - (K1/K2)\cdot\int(\epsilon + Kp\cdot\epsilon) \quad (11)$$

Substituting equation (11) for the equation (10), followed by rearrangement, provides the following equation (12):

$$Suf = \{Kp + (K1/K2) - (K2/J)\}\cdot Suf - Kp^2\cdot\epsilon - \{Kp + (K1/K2)\}(K1/K2)\int(\epsilon + Kp\cdot\epsilon) + \theta d + (A/J)\cdot\theta + (Gr/J) + (\tau d/J) - (\tau 1/J) \quad (12)$$

From equation (12), the derivative of the Liapunov function is given as follows:

$$Suf\cdot Suf = \{Kp + (K1/K2) - (K2/J)\}\cdot Suf^2 - Suf[Kp^2\cdot\epsilon + \{Kp + (K1/K2)\}(K1/K2)\cdot\int(\epsilon + Kp\cdot\epsilon) - \theta d - (A/J)\cdot\theta - (Gr/J) - (\tau d/J) + (\tau 1/J)] \quad (13)$$

Consequently, in order for the derivative of the Liapunov function to be always negative, the following formulas (14) and (15) need to hold:

$$Kp + (K1/K2) - (K2/J) < 0 \quad (14)$$

$$-Suf[Kp^2\cdot\epsilon + \{Kp + (K1/K2)\}(K1/K2)\cdot \quad (15)$$

$$\int(\epsilon + Kp\cdot\epsilon) - \theta d - (A/J)\cdot\theta -$$

$$(Gr/J) - (\tau d/J) + (\tau 1/J)] < 0$$

From formula (14), $$Kp < (K2/J) - (K1/K2) \quad (14')$$

Given that the variation range of the inertia J of the controlled system is $Jmin \leq J \leq Jmax$ (Jmin and Jmax are expected minimum and maximum inertias, respectively), in order for formula (14') to always hold, the value of Kp must be smaller than the minimum value of the right side. Accordingly, the position gain Kp of the position loop and the integral and proportional gains K1 and K2 of the speed loop need be selected in order for the following formula (16) to hold:

$$Kp < (K2/Jmax) - (K1/K2) \quad (16)$$

Here, it is assumed that the switching input $\tau 1$ can be expressed using terms related to $\epsilon$, $\int(\epsilon + Kp\cdot\epsilon)$, $\eta d$, $\eta$, Gr and $\tau d$, as shown in the following equation (17):

$$\tau 1 = L1(\epsilon) + L2\{\int(\epsilon + Kp\cdot\epsilon)\} + L3(\theta d) + L4(\theta) + L5(-Gr) + L6(\tau d) \quad (17)$$

From equation (17), formula (15) can be rewritten into the following formula (18):

$$-Suf[Kp^2\cdot\epsilon + \{L1(\epsilon)/J\} + \{Kp + (K1/K2)\}(K1/K2)\cdot \quad (18)$$

$$\int(\epsilon + Kp\cdot\epsilon) + \{L2(\int(\epsilon + Kp\cdot\epsilon))/J\} - \theta d +$$

$$\{L3(\theta d)/J\} - (A/J)\cdot\theta + \{L4(\theta)/J\} - (Gr/J) +$$

$$\{L5(Gr)/J\} - (\tau d/J) + \{L6(\tau d)/J\}] < 0$$

In order for formula (18) to hold at all times, the terms related to $\epsilon$, $\int(\epsilon + Kp\cdot\epsilon)$, $\theta d$, $\theta$, Gr and $\tau d$ must individually be negative. That is, the elements $L1(\epsilon)$, $L2(\int(\epsilon + Kp\cdot\epsilon))$, $L3(\eta d)$, $L4(\theta)$, $L5(Gr)$ and $L6(\tau d)$ of the switching input need to be determined as follows:

(1) When $Suf \geq 0$,

I) for $L1(\epsilon)$, $Kp^2\cdot\epsilon = \{L1(\epsilon)/J\} > 0$ need to hold, i.e., $L1(\epsilon) > -Kp^2\cdot J\cdot\epsilon$, and, for this formula to hold at all times in the range $Jmin \leq J \leq Jmax$, the following conditions need be fulfilled:

if $\epsilon \geq 0$, $L1(\epsilon) = -Kp^2\cdot Jmin\cdot\epsilon$ if $\epsilon < 0$, $L1(\epsilon) = -Kp^2\cdot Jmax\cdot\epsilon \quad (19)$ The individual elements of the switching input are determined in a single manner.

II) For $L2(\int(\epsilon + Kp\cdot\epsilon))$, (20)
 if $\int(\epsilon + Kp\cdot\epsilon) \geq 0$,
 $L2(\int(\epsilon + Kp\cdot\epsilon)) = -Jmin\cdot\{Kp + (K1/K2)\}\cdot(K1/K2)\cdot\int(\epsilon + Kp\cdot\epsilon)$
 if $\int(\epsilon + Kp\cdot\epsilon) < 0$,
 $L2(\int(\epsilon + Kp\cdot\epsilon)) = -Jmax\cdot\{Kp + (K1/K2)\}\cdot(K1/K2)\cdot\int(\epsilon + Kp\cdot\epsilon)$ III) For $L3(\theta d)$, (21)
 if $\theta d \geq 0$, $L3(\theta d) = Jmax\cdot\theta d$
 if $\theta d < 0$, $L3(\theta d) = Jmin\cdot\theta d$ IV) For $L4(\theta)$, (22)
 if $\theta \geq 0$, $L4(\theta) = Amax\cdot\theta$
 if $\theta < 0$, $L4(\theta) = Amin\cdot\theta$ V) $L5(Gr) = Grmax$ (23)

VI) $L6(\tau d) = \tau dmax$ (24)

(2) When $Suf < 0$,

I) for $L1(\epsilon)$, (25)
 if $\epsilon \geq 0$, $L1(\epsilon) = -Kp^2\cdot Jmax\cdot\epsilon$ -continued if $\epsilon < 0$, $L1(\epsilon) = -Kp^2 \cdot Jmin \cdot \epsilon$ II) for $L2(\int(\epsilon + Kp \cdot \epsilon))$, (26)

if $\int(\epsilon + Kp \cdot \epsilon) \geq 0$,
$L2(\int(\epsilon + Kp \cdot \epsilon)) = Jmax \cdot \{Kp + (K1/K2)\} \cdot (K1/K2) \cdot \int(\epsilon + Kp \cdot \epsilon)$
if $\int(\epsilon + Kp \cdot \epsilon) < 0$,
$L2(\int(\epsilon + Kp \cdot \epsilon)) = Jmin \cdot \{Kp + (K1/K2)\} \cdot (K1/K2) \cdot \int(\epsilon + Kp \cdot \epsilon)$ III) for $L3(\theta d)$, (27)

if $\theta d \geq 0$, $L3(\theta d) = Jmin \cdot \theta d$
if $\theta d < 0$, $L3(\theta d) = Jmax \cdot \theta d$ IV) for $L4(\theta)$, (28)

if $\theta \geq 0$, $L4(\theta) = Amin \cdot \theta$
if $\theta < 0$, $L4(\theta) = Amax \cdot \theta$ V) $L5(Gr) = Grmin$ (29)

VI) $L6(\tau d) = \tau dmin$ (30)

In the above formulas (19) to (30), Jmax and Jmin are expected maximum and minimum inertias, respectively, of the controlled system; Amax and Amin, expected maximum and minimum coefficients of kinetic friction, respectively; Grmax and Grmin, expected maximum and minimum gravities, respectively; and $\tau dmax$ and $\tau dmin$, expected maximum and minimum disturbances, respectively.

The switching input $\tau 1$ is determined in the aforementioned manner, and is added to the torque command obtained by ordinary linear control (involving position loop control based on P control and speed loop control based on PI control) so that the derivatives of the Liapunov function can always be kept negative, whereby a stable control system converging to the switching surface can be obtained.

As seen from equation (1) and FIG. 1, the value of the switching surface Suf can be obtained by dividing the torque command $\tau 0$, obtained by the linear control, by the proportional gain K2 of the speed loop. Thus, the sign, positive or negative, of the switching surface Suf is dependent on the sign of the torque command value obtained by the linear control, and parameters determining the values of the individual terms of the switching input $\tau 1$ are derived during the linear control processing.

Figure 2:
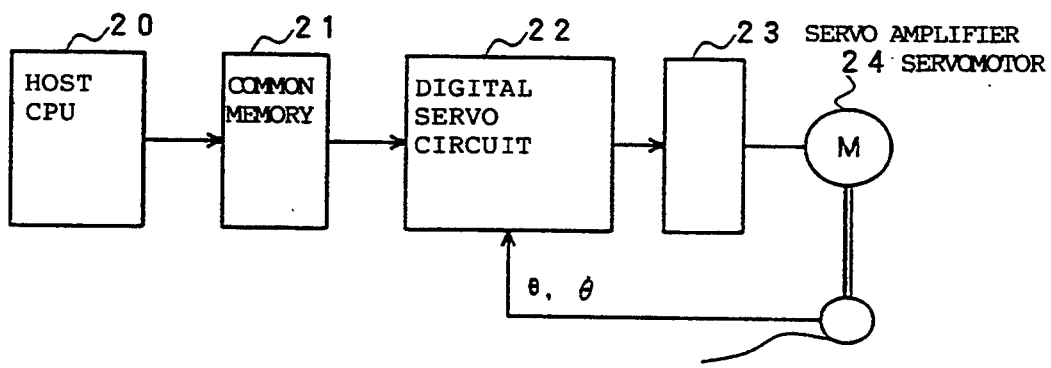
FIG. 2 is a block diagram of a principal part of a servomotor control unit for carrying out the control method illustrated in FIG. 1.

FIG. 2 is a block diagram of a principal part of a servomotor control unit for carrying out the method of this invention. Referring to FIG. 2, a common memory 21 receives various commands for a servomotor 24, from a host CPU 20, and transfers them to the processor of a digital servo circuit 22. The digital servo circuit 22 comprises, in addition to the processing, a ROM, a RAM, etc., and the processor executes processing for controlling the position, speed, and current of the servomotor 24. A servo amplifier 23 comprises a transistor inverter or the like, and drives the servomotor 24 in accordance with the signal from the digital servo circuit 22. A position/speed detector 25 detects the rotational position and speed of the servomotor 24, and feeds back signals representing the detected position and speed to the digital servo circuit 22.

The above-described configuration is similar to that of a well-known digital servo circuit used for controlling servomotors in a robot, machine tool or the like.

Figure 3:
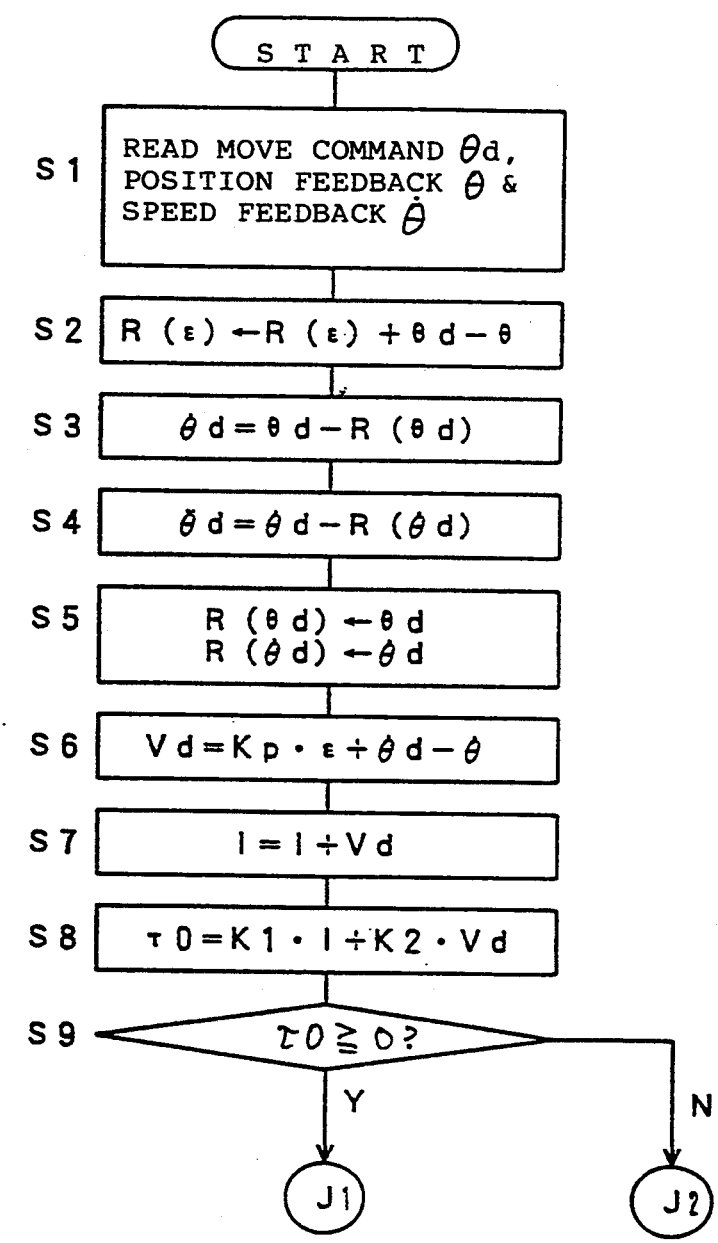
FIG. 3 is part of a flowchart showing a feedforward process, position loop process, speed loop process, and sliding mode process, which are executed by a processor of a digital servo circuit shown in FIG. 2.
Figure 4:
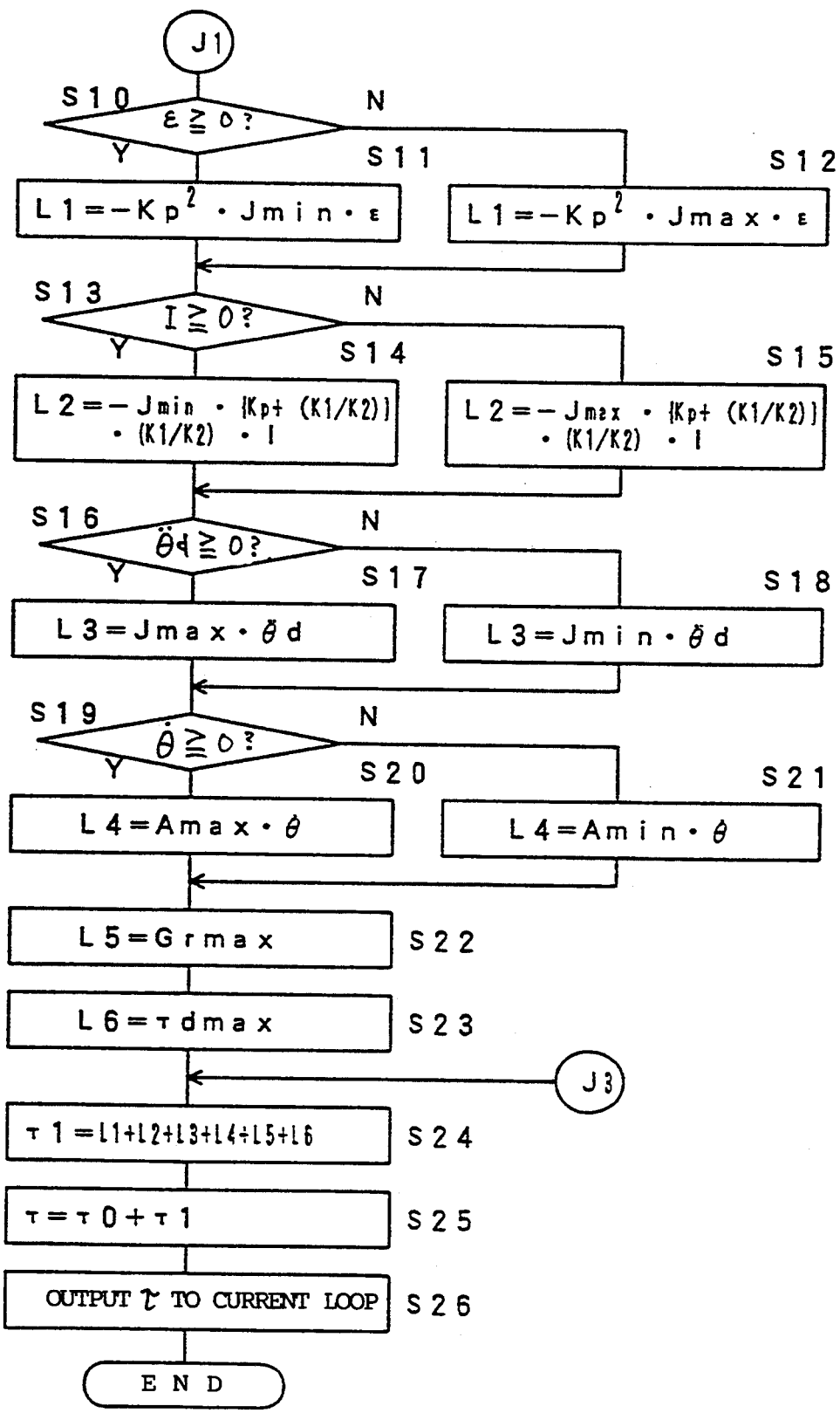
FIG. 4 and FIG. 5 are individually the subsequent part of the flowchart shown in FIG. 3.
Figure 5:
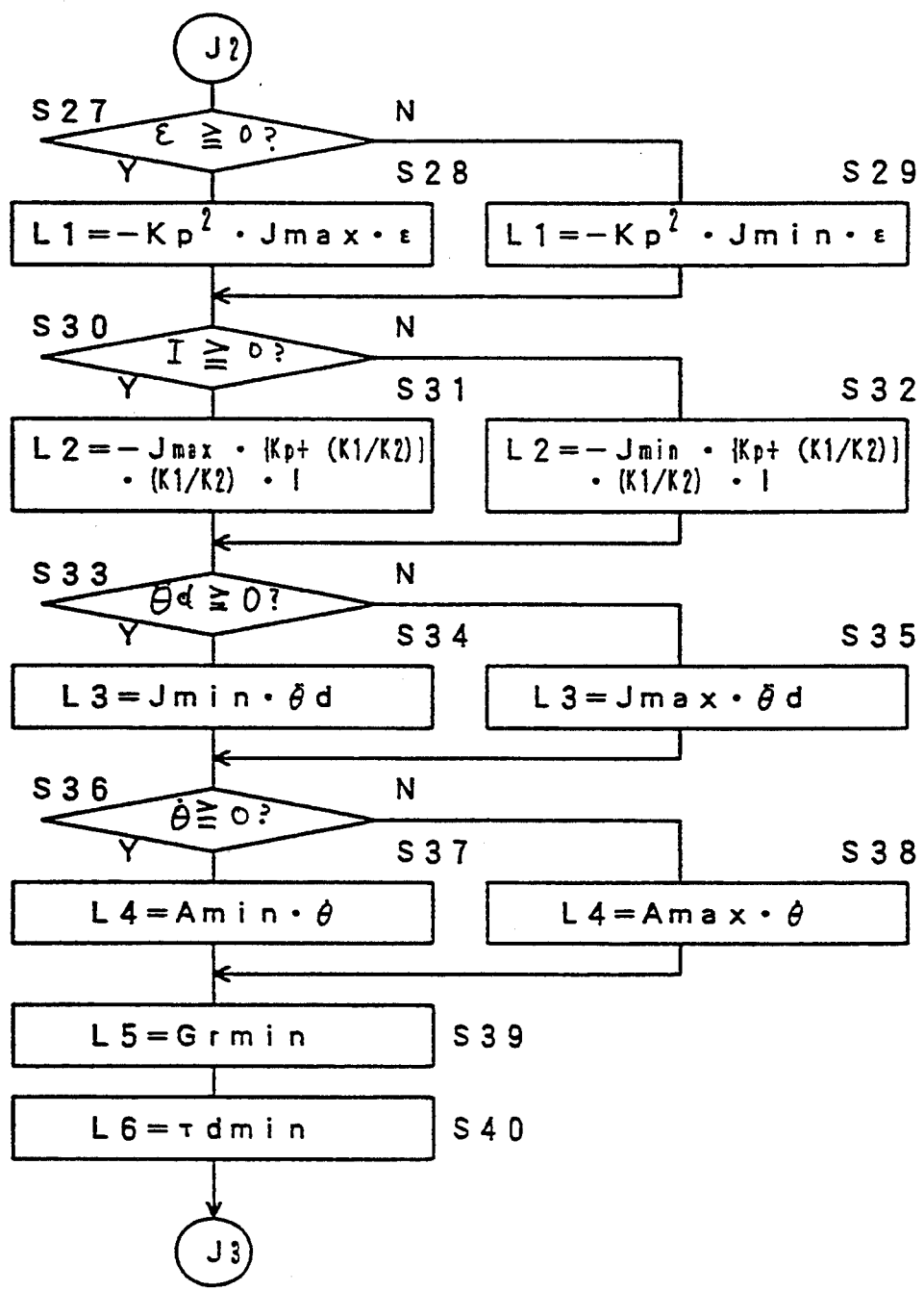

FIGS. 3 to 5 illustrate a flowchart for a feedforward processing, position loop processing, speed loop processing, and sliding mode processing which are executed by the processor of the digital servo circuit 22 in this embodiment.

The processor executes the processing shown in FIGS. 3 to 5 at predetermined intervals of time (position/speed loop processing period).

First, in Step S1, a move command $\eta d$ for each present position/speed loop is obtained based on the move command supplied from the host CPU 20 via the common memory 21, and the outputs of position and speed feedback values from the position/speed detector 25 are read. Then, in Step S2, a value obtained by subtracting the position feedback value $\theta$ from the move command $\theta d$ is added to the value in a register $R(\epsilon)$, which stores the position deviation $\epsilon$, to thereby obtain a position deviation $\epsilon$ of the relevant cycle.

Subsequently, in Step S3, the value in a register $R(\theta d)$, which stores the move command of the preceding cycle, is subtracted from the move command $\theta d$ to obtain a feedforward quantity $\theta d$ (speed of the move command $\theta d$) (differential of the move command in FIG. 1). Then, in Step S4, the value in a register, which stores the feedforward quantity of the preceding cycle, is subtracted from the feedforward quantity $\theta d$ to obtain an acceleration $\theta d$ of the move command. In the following Step S5, the move command $\theta d$ obtained in Step S1 and the feedforward quantity $\theta d$ obtained in Step S3 are stored in the register for storing the move command and the register for storing the feedforward quantity respectively for use in the subsequent cycle.

Then, in Step S6, a value Vd is obtained by adding the feedforward quantity $\theta d$ to the product of the position gain Kp and the position deviation $\epsilon$, which has been obtained in Step S2, and then by subtracting the speed feedback value $\theta$, which has been read in Step S1, from the previously obtained summation value. In Step S7, the value Vd is added to the value in an accumulator I to obtain an integral value (integration in the speed loop process shown in FIG. 1). In Step S8, the product of the value in the accumulator I and the integral gain K1 is added to the product of the value Vd and the proportional gain K2, to obtain a torque command $\tau 0$ according to linear control (processing according to the position loop P control and speed loop PI control using conventional feedforward).

The position gain Kp, the integral gain K1, and the proportional gain K2 are set in advances as parameters to satisfy the relationship expressed by formula (16), and the maximum and minimum values such as Jmax and Jmin of inertia, the maximum and minimum values Amax and Amin of kinetic friction coefficient, the maximum and minimum values Grmax and Grmin of the gravity term, and the expected maximum and minimum values $\tau dmax$ and $\tau dmin$ of disturbance are also set as parameters. These parameters are stored in a memory of the digital servo circuit.

In Step S9, it is judged whether the torque command $\tau 0$ has a value greater than or equal to "0." The sign of the torque command $\tau 0$ is identical with that of the switching surface Suf as mentioned above, and thus the sign of the switching surface Suf can be judged in accordance with the sign of the torque command $\tau 0$. If the torque command $\tau 0$ is "0"0 or a positive value, the individual terms of the switching input $\tau 1$ are determined the following manner, as shown in formulas (19) to (24).

First, if the position deviation $\epsilon$, obtained in Step S2, has a value greater than or equal to "0," "$-Kp^2 \cdot Jmin \cdot \epsilon$" will be stored in a register L1, and, if the position deviation $\epsilon$ is negative, "$-Kp^2 \cdot Jmax \cdot \epsilon$" will be stored in the register L1 (Steps S10 to S12). That is, the processing represented by formulas (19) will be executed.

Subsequently, if the integral value obtained in Step S7 and stored in the accumulator I has a value greater than or equal to "0," "$-J\text{min}\cdot\{Kp+(K1/K2)\}\cdot(K1/K2)\cdot(\text{value of the accumulator I})$" is stored in a register L2, and, if the integral value stored in the accumulator I is negative, "$-J\text{max}\cdot\{Kp+(K1/K2)\}\cdot(K1/K2)\cdot(\text{value of the accumulator I})$" is stored in the register L2 (Steps S13 to S15). That is, the processing represented by formulas (20) is carried out.

Further, in Steps S16 to S18, it is judged whether the acceleration obtained in Step S4, which is the second-time derivative of the move command, has a value greater than or equal to "0," and if the value of the acceleration is "0" or more, the product of the acceleration value and the maximum inertia value Jmax is stored in a register L3; if the acceleration value is negative, the product of the acceleration value and the minimum inertia value Jmin is stored in the register L3. This processing is equivalent to that represented by formulas (21).

Then, in Steps S19 to S21, it is judged whether the speed feedback has a value greater than or equal to "0," and, if the speed feedback value is "0" or more, the product of the speed feedback value and the maximum friction coefficient Amax is stored in a register L4; if the speed feedback value is negative, the product of the speed feedback value and the minimum friction coefficient Amin is stored in the register L4. This processing is equivalent to that represented by formula (22).

Further, in Step S22, "Grmax" is stored in a register L5, and, in Step S23, "τdmax" is stored in a register L6 (processing expressed by formulas (28) and (29)).

In Step S24, the values stored in the individual registers L1 to L6 are added together to obtain a switching input τ1, and then, in Step S25, the thus-obtained switching input τ1 is added to the torque command τ0, which is obtained in Step S8 by the linear control processing, thereby obtaining a corrected torque command τ. The torque command τ is outputted to a current looping Step S26, and the processing for the relevant position/speed loop processing period is ended.

If it is judged in Step S9 that the torque command τ0 based on the linear control is negative, the program proceeds from Step S9 to Step S27. In the subsequent Steps S27 to S40, the judgment and processing represented by formulas (25) to (30) are executed to obtain values of the individual terms of the switching input τ1, and the values obtained are stored in the registers L1 to L6. After executing Step S40, the program returns to Step S24, and, in Steps S24 to S26, the values stored in the registers L1 to L6 are added together to obtain a switching input τ1; the switching input τ1 is added to the torque command τ0, which is obtained by the linear control process, to obtain a torque command τ; and the obtained torque command is outputted to the current loop, as described above.

The aforementioned processing is executed for each position/speed loop processing period.

Now, how to execute the bang-bang control (method of controlling a servomotor only by means of a ±maximum current thereof by adjusting the driving current to ±maximum current) will be described.

In this case, the switching input τ1 is set to a value equal to the absolute value of a maximum torque τmax that the servomotor can output, with a sing (positive or negative) thereof set to that identical with the sing of the switching surface Suf, i.e., the sign of the output τ0 of the linear control. This procedure can remarkably simplify the processing. More specifically, in Step S9, the sign of τ0 is read instead of executing Steps S10 to S40, the read sign is attached to the maximum torque τmax to obtain a switching input τ1, and the output τ0 of the linear control is added to the switching input τ1, with the result to be used as a torque command τ for the current loop.

In the above embodiment, feedforward control is used for the linear control, but this invention can be applied to an ordinary control not based on feedforward control such as a P control for position control and a PI control for speed control. In such cases, when obtaining the value Vd, which is inputted to the speed loop for processing the integral and proportional terms, the value ($\epsilon$) obtained by differentiating the position deviation $\epsilon$ is replaced by the negative speed feedback value ($-\theta$). That is, an ordinary speed deviation is used for the value Vd. Thus, the term of function L3 is omitted, switching input also varies correspondingly.

According to this invention, sliding mode control can easily be applied without substantially modifying conventional linear control, whereby the disturbance suppressing ability can be improved. Furthermore, since conventional linear control is sued, various linear control techniques developed so far can be utilized.

I claim:

1. A method of controlling a servomotor in a sliding mode, comprising the steps of:

obtaining a torque command ($\tau 0$) for carrying out a proportional control for a position loop and a proportional-plus-integral control for a speed loop;

setting a phase surface of the sliding mode to be in proportion to the torque command ($\tau 0$) obtained by a position loop processing according to the proportional control and a speed loop processing according to the proportional-plus-integral control;

providing individual gains for a switching input ($\tau 1$) which are set based on the following relationship:

$$Kp < (K2/J\text{max}) - (K1/K2)$$

where Kp is a position gain of the position loop, K1 is an integral gain of the speed loop, K2 is a proportional gain of the speed loop, and Jmax is a maximum inertia of a controlled system, so that the derivative of a Liapunov function is always negative, and is determined in accordance with signs of respective values of the torque command ($\tau 0$), a position deviation ($\epsilon$), an integral (I) of the position deviation and a speed deviation, acceleration ($\theta d$) of a move command, and speed feedback ($\theta$), which are obtained by the position loop process according to the proportional control and the speed loop process according to the proportional-plus-integral control;

adding the switching input ($\tau 1$) to the torque command ($\tau 0$) to obtain a corrected torque command ($\tau$); and driving the servomotor in accordance with the corrected torque command ($\tau$).

2. A method according to claim 1, wherein, the controlled system is expressed as $$J\cdot\theta + A\cdot\theta + Gr + \tau d = \tau$$

where J is an inertia, A is a coefficient of kinetic friction, Gr is a gravity term, and $\tau d$ is an expected disturbance, and that the switching input ($\tau 1$) is expressed as $$\tau 1 = L1(\epsilon) + L2\{\int(\epsilon + Kp\cdot\epsilon)\} + L3(\theta d) + L4(\theta) + L5(-Gr) + L6(\tau d),$$

respective values of elements $L1(\epsilon)$, $L2\{\int(\epsilon+Kp\cdot\epsilon)\}$, $L3(\theta d)$, $L4(\theta)$, $L5(Gr)$ and $L6(\tau d)$ of the switching input are set such that a relationship of $$-Suf[Kp^2 \cdot \epsilon + \{L1(\epsilon)/J\} + \{Kp + (K1/K2)\}(K1/K2) \cdot$$
$$\int(\epsilon + Kp \cdot \epsilon) + \{L2(\int(\epsilon + Kp \cdot \epsilon))/J\} - \theta d +$$
$$\{L3(\theta d)/J\} - (A/J) \cdot \theta + \{L4(\theta)/J\} - (Gr/J) +$$
$$\{L5(Gr)/J\} - (\tau d/J) + \{L6(\tau d)/J\}] < 0$$

is satisfied.

3. A method of controlling a servomotor in a sliding mode, comprising the steps of:

obtaining a torque command ($\tau 0$) for carrying out a proportional control for a position loop and a proportional-plus-integral control for a speed loop;

setting a phase surface of the sliding mode to be in proportion to the torque command ($\tau 0$) obtained by a position loop processing according to the proportional control and a speed loop processing according to the proportional-plus-integral control;

providing individual gains for a switching input ($\tau 1$) which are set based on the following relationship;
$$Kp < (K2/Jmax) - (K1/K2)$$

where Kp is a position gain of the position loop, K1 is an integral gain of the speed loop, K2 is a proportional gain of the speed loop, Jmax is a maximum inertia of a controlled system, and is given as a value which is a combination of an absolute value of a maximum torque ($\tau$max) that the servomotor can output, and a positive or negative sign identical with that of the torque command ($\tau 0$), which is obtained by the position loop process according to the proportional control and the speed loop process according to the proportional-plus-integral control;

adding the switching input ($\tau 1$) to the torque command ($\tau 0$) to obtain a corrected torque command ($\tau$); and driving the servomotor in accordance with the corrected torque command ($\tau$).

* * * * *

UNITED STATES PATENT AND TRADEMARK OFFICE
CERTIFICATE OF CORRECTION

PATENT NO. : 5,384,525  Page 1 of 11
DATED : January 24, 1995
INVENTOR(S) : Tetsuaki KATO It is certified that error appears in the above-indentified patent and that said Letters Patent is hereby corrected as shown below:

COLUMN 2

Line 9, "Suf = $\epsilon$ + Kp · $\epsilon$ + (K1/K2) · $\int$ ($\epsilon$ + Kp · $\epsilon$)" should be --Suf = $\dot{\epsilon}$ + Kp · $\epsilon$ + (K1/K2) · $\int$ ($\dot{\epsilon}$ + Kp · $\epsilon$)--;

Line 17, "give" should be --given--;

Line 28, "V = Suf · Suf" should be --$\dot{V}$ = $\dot{S}$uf · Suf--;

Line 31, "(30)" should be --(3)--;

Line 35, "coverage" should be --converge--;

Line 43, "$\tau$=K2·{$\epsilon$+Kp·$\epsilon$+(K1/K2)·$\int$($\epsilon$+Kp·$\epsilon$)}+$\tau$1" should be --$\tau$=K2·{$\dot{\epsilon}$+Kp·$\epsilon$+(K1/K2)·$\int$($\dot{\epsilon}$+Kp·$\epsilon$)}+$\tau$1--;

Line 44, "=K2·{$\epsilon$+Kp·$\epsilon$)+K1·$\int$($\epsilon$+Kp·$\epsilon$)+$\tau$1" should be --=K2·($\dot{\epsilon}$+Kp·$\epsilon$)+K1·$\int$($\dot{\epsilon}$+Kp·$\epsilon$)+$\tau$1--;

Line 48, "$\eta$d" should be --$\theta$d"; and "$\eta$," should be --$\theta$,--;

Line 51, "$\epsilon$=$\eta$d-$\eta$" should be --$\epsilon$=$\theta$d-$\theta$--;

Line 53, "$\epsilon$=$\eta$d-$\eta$" should be --$\dot{\epsilon}$=$\dot{\theta}$d-$\dot{\theta}$--;

Line 55, "$\epsilon$=$\eta$d-$\eta$" should be --$\ddot{\epsilon}$=$\ddot{\theta}$d-$\ddot{\theta}$--;

COLUMN 3 line 1, "(8)" should be --(6)--.

Line 1, "J·$\eta$+A·$\eta$+Gr+$\tau$d=$\tau$" should be --J·$\ddot{\theta}$+A·$\dot{\theta}$+Gr+$\tau$d=$\tau$--;

Line 9, "Suf=$\epsilon$+{Kp+(K1/K2)}·$\epsilon$+(K1/K2)}·Kp·$\epsilon$" should be --$\dot{S}$uf=$\ddot{\epsilon}$+{Kp+(K1/K2)}·$\dot{\epsilon}$+(K1/K2)·Kp·$\epsilon$--;

Line 14, "$\epsilon$=$\eta$d+(A/J)·$\eta$+(Gr/J)+($\tau$d/J)-($\tau$/J)" should be --$\ddot{\epsilon}$=$\ddot{\theta}$d+(A/J)·$\dot{\theta}$+(Gr/J)+($\tau$d/J)-($\tau$/J)--;

UNITED STATES PATENT AND TRADEMARK OFFICE
CERTIFICATE OF CORRECTION

PATENT NO. : 5,384,525
DATED : January 24, 1995
INVENTOR(S) : Tetsuaki KATO

It is certified that error appears in the above-indentified patent and that said Letters Patent is hereby corrected as shown below:

COLUMN 3 (continued)

Lines 19-21, "$\epsilon = \theta d + (A/J) \cdot \theta + (Gr/J) + (\tau d/J) - (K2/J) \cdot (\epsilon + Kp \cdot \epsilon) - (K1/J) \cdot \int (\epsilon + KP \cdot \epsilon) - (\tau 1/j)$" should be --$\ddot{\epsilon} = \ddot{\theta} d + (A/J) \cdot \dot{\theta} + (Gr/J) + (\tau d/J)$
$- (K2/J) \cdot (\dot{\epsilon} + Kp \cdot \epsilon)$
$- (K1/J) \cdot \int (\dot{\epsilon} + Kp \cdot \epsilon) - (\tau 1/J)$--

Line 27-30, "$Suf = \{Kp + (K1/K2) - (K2/J)\} \cdot \epsilon +$
$\{(K1/K2) \cdot Kp - (K2/J) \cdot Kp\} \cdot \epsilon +$
$\theta d + (A/J) \cdot \theta + (Gr/J) + (\tau d/J) -$
$(K1/J) \cdot \int (\epsilon + Kp \cdot \epsilon) - (\tau 1/J)$" should be --$\dot{S}uf = \{Kp + (K1/K2) - (K2/J)\} \cdot \dot{\epsilon}$
$+ \{(K1/K2) \cdot Kp - (K2/J) \cdot Kp\} \cdot \epsilon$
$+ \ddot{\theta} d + (A/J) \cdot \dot{\theta} + (Gr/J) + (\tau d/J)$
$- (K1/J) \cdot \int (\dot{\epsilon} + Kp \cdot \epsilon) - (\tau 1/J)$--;

Line 36, "$\epsilon = Suf - Kp \cdot \epsilon - (K1/K2) \cdot \int (\epsilon + Kp \cdot \epsilon)$" should be --$\dot{\epsilon} = Suf - Kp \cdot \epsilon - (K1/K2) \cdot \int (\dot{\epsilon} + Kp \cdot \epsilon)$--;

Lines 52-55, "$Suf \cdot \dot{S}uf = \{Kp + (K1/K2) - (K2/J)\} \cdot Suf^2 -$
$Suf [Kp^2 \cdot \epsilon + \{Kp + (K1/K2)\}(K1/K2) \cdot$
$\int (\epsilon + Kp \cdot \epsilon) - \theta d - (A/J) \cdot \theta -$
$(Gr/J) - (\tau d/J) + (\tau 1/J)]$"

UNITED STATES PATENT AND TRADEMARK OFFICE
CERTIFICATE OF CORRECTION

PATENT NO. : 5,384,525

DATED : January 24, 1995

INVENTOR(S) : Tetsuaki KATO

It is certified that error appears in the above-indentified patent and that said Letters Patent is hereby corrected as shown below:

COLUMN 3 (continued)

should be --$Suf \cdot \dot{S}uf = \{Kp + (K1/K2) - (K2/J)\} \cdot Suf^2$ $-Suf[Kp^2 \cdot \epsilon + \{Kp + (K1/K2)\}(K1/K2)$ $\cdot \int (\dot{\epsilon} + Kp \cdot \epsilon) - \ddot{\theta}d - (A/J) \cdot \dot{\theta} -$ $(Gr/J) - (\tau d/J) + (\tau 1/J)]$ --;

Lines 61-66, "$Kp + (K1/K2) - (K2/J) < 0$ $-Suf[Kp^2 \cdot \epsilon + \{Kp + (K1/K2)\}(K1/K2) \cdot$ $\int (\epsilon + Kp \cdot \epsilon) - \theta d - (A/J) \cdot \theta -$ $(Gr/J) - (\tau d/J) + (\tau 1/J)] < 0$"

should be --$Kp + (K1/K2) - (K2/J) < 0$ $-Suf[Kp^2 \cdot \epsilon + \{Kp + (K1/K2)\}(K1/K2)$ $\cdot \int (\dot{\epsilon} + Kp \cdot \epsilon) - \ddot{\theta}d - (A/J) \cdot \dot{\theta}$ $-(Gr/J) - (\tau d/J) + (\tau 1/J)] < 0$--.

COLUMN 4

Line 17, "$\int (\epsilon + Kp \cdot \epsilon), \eta d, \eta,$" should be --$\int (\dot{\epsilon} + Kp \cdot \epsilon), \ddot{\theta}d, \dot{\theta},$--;

Line 20, "$\tau 1 = L1(\epsilon) + L2\{\int (\epsilon + Kp \cdot \epsilon)\} + L3(\theta d) + L4(\theta) + L5(-Gr) + L6(\tau d)$" should be --$\tau 1 = L1(\epsilon) + L2\{\int (\dot{\epsilon} + Kp \cdot \epsilon)\} + L3(\ddot{\theta}d) + L4(\dot{\theta}) + L5(Gr) + L6(\tau d)$--;

UNITED STATES PATENT AND TRADEMARK OFFICE
CERTIFICATE OF CORRECTION

PATENT NO. : 5,384,525
DATED : January 24, 1995
INVENTOR(S) : Tetsuaki KATO

It is certified that error appears in the above-indentified patent and that said Letters Patent is hereby corrected as shown below:

COLUMN 4 (continued)

Lines 26-29, "-Suf[$Kp^2 \cdot \epsilon$ + {L1($\epsilon$)/J} + {Kp+(K1/K2)}(K1/K2) $\cdot \int(\epsilon + Kp \cdot \epsilon)$ + {L2($\int(\epsilon+Kp\cdot\epsilon)$)/J}-$\theta$d + {L3($\theta$d)/J} - (A/J) $\cdot \theta$ + {L4($\theta$)/J} - (Gr/J) + {L5(Gr)/J} - ($\tau$d/J) + {L6($\tau$d)/J}]<0" should be
-- -Suf[$Kp^2 \cdot \epsilon$ + {L1($\epsilon$)/J} + {Kp+(K1/K2)}(K1/K2) $\cdot \int(\dot{\epsilon} + Kp \cdot \epsilon)$ + {L2($\int(\dot{\epsilon}+Kp\cdot\epsilon)$)/J}-$\ddot{\theta}$d + {L3($\ddot{\theta}$d)/J} - (A/J) $\cdot \dot{\theta}$ + {L4($\dot{\theta}$)/J} - (Gr/J) + {L5(Gr)/J} - ($\tau$d/J) + {L6($\tau$d)/J}]<0--;

Line 34, "$\int(\epsilon+Kp\cdot\epsilon)$, $\theta$d, $\theta$, Gr and $\tau$d" should be
--$\int(\dot{\epsilon}+Kp\cdot\epsilon)$, $\ddot{\theta}$d, $\dot{\theta}$, Gr and $\tau$d--;

Line 36, "L2($\int(\epsilon+Kp\cdot\epsilon)$), L3($\eta$d), L4($\theta$), L5(Gr) and L6($\tau$d)" should be --L2($\int(\dot{\epsilon}+Kp\cdot\epsilon)$), L3($\ddot{\theta}$d), L4($\dot{\theta}$), L5(Gr) and L6($\tau$d)--;

UNITED STATES PATENT AND TRADEMARK OFFICE
CERTIFICATE OF CORRECTION

PATENT NO. : 5,384,525  Page 5 of 11
DATED : January 24, 1995
INVENTOR(S) : Tetsuaki KATO It is certified that error appears in the above-indentified patent and that said Letters Patent is hereby corrected as shown below:

<u>COLUMN 4</u> (continued)

Lines 51-64,

"II) For $L2(\int(\epsilon+Kp\cdot\epsilon))$, if $\int(\epsilon + Kp \cdot \epsilon) \geq 0$, $L2(\int(\epsilon + Kp \cdot \epsilon)) = -Jmin \cdot \{Kp+(K1/K2)\} \cdot$ $(K1/K2) \cdot \int(\epsilon + Kp \cdot \epsilon)$ if $\int(\epsilon + Kp \cdot \epsilon) < 0$, $L2(\int(\epsilon + Kp \cdot \epsilon)) = -Jmax \cdot \{Kp + (K1/K2)\} \cdot$ $(K1/K2) \cdot \int(\epsilon + Kp \cdot \epsilon)$ III) For $L3(\theta d)$, if $\theta d \geq 0$, $L3(\theta d) = Jmax \cdot \theta d$ if $\theta d < 0$, $L3(\theta d) = Jmin \cdot \theta d$ IV) For $L4(\theta)$, if $\theta \geq 0$, $L4(\theta) = Amax \cdot \theta$ if $\theta < 0$, $L4(\theta) = Amin \cdot \theta$ V) $L5(Gr) = Grmax$ VI) $L6(\tau d) = \tau dmax$" should be

UNITED STATES PATENT AND TRADEMARK OFFICE
CERTIFICATE OF CORRECTION

PATENT NO. : 5,384,525

DATED : January 24, 1995

INVENTOR(S) : Tetsuaki KATO

It is certified that error appears in the above-indentified patent and that said Letters Patent is hereby corrected as shown below:

COLUMN 4 (continued)

--II) For $L2(\int(\dot{\epsilon}+Kp\cdot\epsilon))$, if $\int(\dot{\epsilon} + Kp \cdot \epsilon) \geq 0$, $L2(\int(\dot{\epsilon} + Kp \cdot \epsilon)) = -Jmin \cdot \{Kp+(K1/K2)\} \cdot (K1/K2) \cdot \int(\dot{\epsilon} + Kp \cdot \epsilon)$ if $\int(\dot{\epsilon} + Kp \cdot \epsilon) < 0$, $L2(\int(\dot{\epsilon} + Kp \cdot \epsilon)) = -Jmax \cdot \{Kp + (K1/K2)\} \cdot (K1/K2) \cdot \int(\dot{\epsilon} + Kp \cdot \epsilon)$ III) For $L3(\ddot{\theta}d)$, if $\ddot{\theta}d \geq 0$, $L3(\ddot{\theta}d) = Jmax \cdot \ddot{\theta}d$ if $\ddot{\theta}d < 0$, $L3(\ddot{\theta}d) = Jmin \cdot \ddot{\theta}d$ IV) For $L4(\dot{\theta})$, if $\dot{\theta} \geq 0$, $L4(\dot{\theta}) = Amax \cdot \dot{\theta}$ if $\dot{\theta} < 0$, $L4(\dot{\theta}) = Amin \cdot \dot{\theta}$ V) $L5(Gr) = Grmax$ VI) $L6(\tau d) = \tau dmax$--;

UNITED STATES PATENT AND TRADEMARK OFFICE
CERTIFICATE OF CORRECTION

PATENT NO. : 5,384,525
DATED : January 24, 1995
INVENTOR(S) : Tetsuaki KATO

It is certified that error appears in the above-indentified patent and that said Letters Patent is hereby corrected as shown below:

COLUMN 5

Lines 1-15, "if $\epsilon < 0$, $L1(\epsilon) = -Kp^2 \cdot Jmin \cdot \epsilon$ II) for $L2(\int(\epsilon + Kp \cdot \epsilon))$, if $\int(\epsilon + Kp \cdot \epsilon) \geq 0$, $L2(\int(\epsilon + Kp \cdot \epsilon)) = Jmax \cdot \{Kp + (K1/K2)\} \cdot$ $(K1/K2) \cdot \int(\epsilon + Kp \cdot \epsilon)$ if $\int(\epsilon + Kp \cdot \epsilon) < 0$, $L2(\int(\epsilon + Kp \cdot \epsilon)) = Jmin \cdot \{Kp + (K1/K2)\} \cdot$ $(K1/K2) \cdot \int(\epsilon + Kp \cdot \epsilon)$ III) for $L3(\theta d)$, if $\theta d \geq 0$, $L3(\theta d) = Jmin \cdot \theta d$ if $\theta d < 0$, $L3(\theta d) = Jmax \cdot \theta d$ IV) for $L4(\theta)$, if $\theta \geq 0$, $L4(\theta) = Amin \cdot \theta$ if $\theta < 0$, $L4(\theta) = Amax \cdot \theta$ V)   $L5(Gr) = Grmin$ VI)  $L6(\tau d) = \tau dmin$" should be

UNITED STATES PATENT AND TRADEMARK OFFICE
CERTIFICATE OF CORRECTION

PATENT NO. : 5,384,525           Page 8 of 11
DATED : January 24, 1995
INVENTOR(S) : Tetsuaki KATO It is certified that error appears in the above-indentified patent and that said Letters Patent is hereby corrected as shown below:

COLUMN 5 (continued)

--if $\epsilon < 0$, $L1(\epsilon) = -Kp^2 \cdot Jmin \cdot \epsilon$

II) for $L2(\int(\dot{\epsilon} + Kp \cdot \epsilon))$, if $\int(\dot{\epsilon} + Kp \cdot \epsilon) \geq 0$, $L2(\int(\dot{\epsilon} + Kp \cdot \epsilon)) = Jmax \cdot \{Kp + (K1/K2)\} \cdot (K1/K2) \cdot \int(\dot{\epsilon} + Kp \cdot \epsilon)$ if $\int(\dot{\epsilon} + Kp \cdot \epsilon) < 0$, $L2(\int(\dot{\epsilon} + Kp \cdot \epsilon)) = Jmin \cdot \{Kp + (K1/K2)\} \cdot (K1/K2) \cdot \int(\dot{\epsilon} + Kp \cdot \epsilon)$ III) for $L3(\ddot{\theta}d)$, if $\ddot{\theta}d \geq 0$, $L3(\ddot{\theta}d) = Jmin \cdot \ddot{\theta}d$ if $\ddot{\theta}d < 0$, $L3(\ddot{\theta}d) = Jmax \cdot \ddot{\theta}d$ IV) for $L4(\dot{\theta})$, if $\dot{\theta} \geq 0$, $L4(\dot{\theta}) = Amin \cdot \dot{\theta}$ if $\dot{\theta} < 0$, $L4(\dot{\theta}) = Amax \cdot \dot{\theta}$ V) $L5(Gr) = Grmin$ VI) $L6(\tau d) = \tau dmin$--;

UNITED STATES PATENT AND TRADEMARK OFFICE
CERTIFICATE OF CORRECTION

PATENT NO. : 5,384,525

DATED : January 24, 1995

INVENTOR(S) : Tetsuaki KATO

It is certified that error appears in the above-indentified patent and that said Letters Patent is hereby corrected as shown below:

COLUMN 6

Line 4, "$\eta d$" should be --$\theta d$--;

Line 17, "$\theta d$" should be --$\dot{\theta}$--;

Line 21, "$\theta d$" should be --$\dot{\theta}$--;

Line 22, "$\theta d$" should be --$\ddot{\theta} d$--;

Line 24, "$\theta d$" should be --$\dot{\theta}$--;

Line 29, "$\theta d$" should be --$\dot{\theta} d$--;

Line 32, "$\theta$" should be --$\dot{\theta}$--;

Line 61, "$\tau 0$ is "0"0" should be --$\tau 0$ is "0"--;

Line 63, after "determined", insert --in--;

COLUMN 7

Line 67, "sing" should be --sign--;

Line 68, "sing" should be --sign--.

COLUMN 8

Line 27, "sued" should be --used--;

Line 55, "($\theta d$) should be --($\ddot{\theta} d$); and "($\theta$)" should be --($\dot{\theta}$)--;

Line 67, "$J \cdot \theta + A \cdot \theta + Gr + \tau d = \tau$" should be --$J \cdot \ddot{\theta} + A \cdot \dot{\theta} + Gr + \tau d = \tau$--;

UNITED STATES PATENT AND TRADEMARK OFFICE
CERTIFICATE OF CORRECTION

PATENT NO. : 5,384,525

DATED : January 24, 1995

INVENTOR(S) : Tetsuaki KATO

It is certified that error appears in the above-indentified patent and that said Letters Patent is hereby corrected as shown below:

COLUMN 9

Lines 5 and 6, "$\tau 1 = L1(\epsilon) + L2\{\int(\epsilon + Kp \cdot \epsilon)\} + L3(\theta d) + L4(\theta) + L5(-Gr) + L6(\tau d),$" should be $--\tau 1 = L1(\epsilon) + L2\{\int(\dot{\epsilon} + Kp \cdot \epsilon)\} + L3(\dot{\theta} d) + L4(\dot{\theta}) + L5(Gr) + L6(\tau d), --;$ Line 9, "$L3(\theta d), L4(\theta),$" should be $--L3(\dot{\theta}d), L4(\dot{\theta}), --;$ Lines 11-17, "$-Suf[Kp^2 \cdot \epsilon + \{L1(\epsilon)/J\}$
$+ \{Kp+(K1/K2)\}(K1/K2) \cdot \int(\epsilon + Kp \cdot \epsilon)$
$+ \{L2(\int(\epsilon + Kp \cdot \epsilon))/J\} - \theta d$
$+ \{L3(\theta d)/J\} - (A/J) \cdot \theta + \{L4(\theta)/J\}$
$- (Gr/J) + \{L5(Gr)/J\} - (\tau d/J)$
$+ \{L6(\tau d)/J\}] < 0$" should be $-- -Suf[Kp^2 \cdot \epsilon + \{L1(\epsilon)/J\}$
$+ \{Kp+(K1/K2)\}(K1/K2) \cdot \int(\dot{\epsilon} + Kp \cdot \epsilon)$
$+ \{L2(\int(\dot{\epsilon} + Kp \cdot \epsilon))/J\} - \ddot{\theta}d$
$+ \{L3(\ddot{\theta}d)/J\} - (A/J) \cdot \dot{\theta} + \{L4(\dot{\theta})/J\}$
$- (Gr/J) + \{L5(Gr)/J\} - (\tau d/J)$
$+ \{L6(\tau d)/J\}] < 0$"--.

UNITED STATES PATENT AND TRADEMARK OFFICE
CERTIFICATE OF CORRECTION

PATENT NO. : 5,384,525
DATED : January 24, 1995
INVENTOR(S) : Tetsuaki KATO

It is certified that error appears in the above-indentified patent and that said Letters Patent is hereby corrected as shown below:

COLUMN 10

Line 5, "relationship;" should be --relationship:--.

Signed and Sealed this

Sixteenth Day of April, 1996

Attest:

BRUCE LEHMAN

Attesting Officer

Commissioner of Patents and Trademarks